(12) United States Patent
Jeong et al.

(10) Patent No.: US 8,608,072 B2
(45) Date of Patent: Dec. 17, 2013

(54) MEMORY CARD SOCKET AND DATA PROCESSING DEVICE INCLUDING THE SAME

(75) Inventors: Sung Won Jeong, Suwon-si (KR); Jong-Deok Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/422,744

(22) Filed: Mar. 16, 2012

(65) Prior Publication Data

US 2012/0234917 A1 Sep. 20, 2012

(30) Foreign Application Priority Data

Mar. 17, 2011 (KR) .................. 10-2011-0024054

(51) Int. Cl.
*G06K 7/00* (2006.01)
*G06K 7/06* (2006.01)
*G06F 1/20* (2006.01)
*H05K 7/10* (2006.01)

(52) U.S. Cl.
USPC ........... 235/441; 235/435; 235/439; 235/486; 235/479; 361/679.31; 361/679.32; 710/301

(58) Field of Classification Search
USPC .................. 235/435, 441, 439, 486, 479; 361/679.31–679.32; 710/301
See application file for complete search history.

(56) References Cited

U.S. PATENT DOCUMENTS

| | | | | |
|---|---|---|---|---|
| 6,130,874 | A * | 10/2000 | Saito | 720/673 |
| 2002/0109967 | A1* | 8/2002 | Nabetani et al. | 361/684 |
| 2003/0065867 | A1* | 4/2003 | Mowery et al. | 710/310 |
| 2003/0222137 | A1* | 12/2003 | Nishimura | 235/380 |

FOREIGN PATENT DOCUMENTS

| | | |
|---|---|---|
| JP | 06-084022 A | 3/1994 |
| JP | 09-319663 A | 12/1997 |
| JP | 2005-018155 A | 1/2005 |
| JP | 2005-284805 A | 10/2005 |

* cited by examiner

*Primary Examiner* — Michael G Lee
*Assistant Examiner* — Laura Gudorf
(74) *Attorney, Agent, or Firm* — Sughrue Mion, PLLC

(57) ABSTRACT

A memory card socket is provided. The memory card socket includes an outer case, an inner case which is movable within the outer case and includes a slot into which a memory card is insertable. The memory card socket also includes a locking portion which locks the inner case to the outer case upon a withdrawal of the memory card.

18 Claims, 10 Drawing Sheets

MEMORY CARD SOCKET AND DATA PROCESSING DEVICE INCLUDING THE SAME

CROSS-REFERENCE TO RELATED APPLICATION

This application claims priority under 35 U.S.C. §119(a) from Korean Patent Application No. 10-2011-0024054 filed on Mar. 17, 2011, the disclosure of which is hereby incorporated by reference in its entirety.

BACKGROUND

Apparatuses consistent with exemplary embodiments relate to a memory card socket, and more particularly, to a memory card socket for preventing data from being damaged in a memory card by preventing a sudden power off (SPO) situation or a sudden power loss (SPL) situation from occurring in the memory card and a data processing device including the same.

A memory card socket is used for communication between a memory card and a host and for connection of the memory card to the host. When the memory card is disconnected from the host, data in the memory card may be damaged.

SUMMARY

One or more exemplary embodiments provide a memory card socket for preventing data in a memory card from being damaged by preventing a sudden power off (SPO) situation or a sudden power loss (SPL) situation from occurring at a withdrawal of the memory card and a data processing device including the same.

According to an aspect of an exemplary embodiment, there is provided a memory card socket including an outer case, an inner case which is movable within the outer case and includes a slot into which a memory card is insertable, and a locking portion which locks the inner case to the outer case upon a withdrawal of the memory card.

The memory card socket may further include a sensor which is disposed within the outer case, senses the withdrawal of the memory card, and generates a sense signal; and a release signal generator which transmits a memory card detachment signal to a host in response to the sense signal and transmits a release signal for releasing a locking of the locking portion to the locking portion, in response to the sense signal.

The sensor may generate the sense signal when a contactor provided in the inner case contacts the sensor. Alternatively, the sensor may generate the sense signal when a contactor provided in the inner case is separated from the sensor.

The locking portion may include a stopper formed inside the outer case and an insertion groove disposed in the inner case to allow the stopper to be inserted therein.

The locking portion may include a stopper disposed inside the outer case and an insertion groove disposed in the inner case into which the stopper is insertable. The locking portion may release the stopper from the insertion groove in response to the release signal.

A pin arrangement of the memory card socket may correspond to a secure digital (SD) card pin arrangement, a multimedia card (MMC) pin arrangement, a subscriber identity module (SIM) card pin arrangement, or a universal SIM (USIM) pin arrangement. The release signal generator may transmit the release signal a predetermined period of time after receiving the sense signal. Alternatively, the release signal generator may transmit the release signal after a data transmission between the memory card and the host stops.

According to an aspect of another exemplary embodiment, there is provided a data processing device including a memory card socket into which a memory card is inserted and a controller configured to control an operation of the memory card. The memory card socket includes an outer case, an inner case which is movable within the outer case and includes a slot into which the memory card is insertable, and a locking portion which locks the inner case to the outer case upon a withdrawal of the memory card.

The data processing device may further include a sensor which is disposed within the outer case, senses the withdrawal of the memory card, and generates a sense signal; and a release signal generator which transmits a memory card detachment signal to a host in response to the sense signal and transmits a release signal for releasing locking of the locking portion to the locking portion, in response to the sense signal.

The sensor may generate the sense signal when a contactor provided in the inner case contacts the sensor. Alternatively, the sensor may generate the sense signal when the contactor provided in the inner case is separated from the sensor.

The locking portion may include a stopper disposed inside the outer case and an insertion groove disposed in the inner case into which the stopper is insertable. The locking portion may include a stopper disposed inside the outer case and an insertion groove, disposed in the inner case, into which the stopper is insertable and may release the stopper from the insertion groove in response to the release signal.

BRIEF DESCRIPTION OF THE DRAWINGS

The above and/or other aspects will be more clearly understood from the following detailed description of exemplary embodiments taken in conjunction with the accompanying drawings in which.

DETAILED DESCRIPTION

Figure 1:
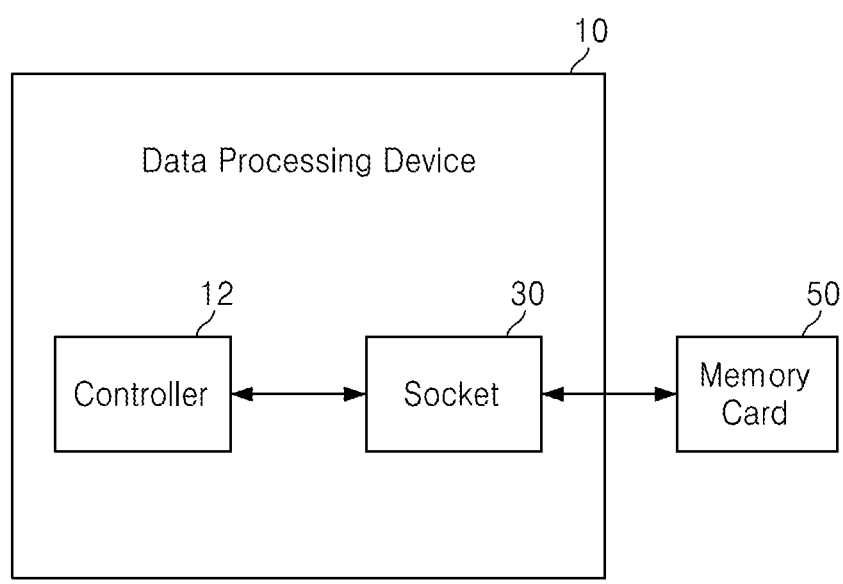
FIG. 1 is a block diagram of a data processing device including a memory card socket according to an exemplary embodiment.

Exemplary embodiments will be described more fully hereinafter with reference to the accompanying drawings. Exemplary embodiments, however, be embodied in many different forms and should not be construed as limited to the embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing device 10 including a memory card socket 30 according to an exemplary embodiment. Referring to FIG. 1, a data processing device 10 includes a controller 12 and a memory card socket 30. The data processing device 10 may also include a processor (not shown) which controls an operation of the controller 12 and an operation of the data processing device 10.

The data processing device 10 may be implemented as a personal computer (PC), a tablet PC, a notebook computer, a digital camera, an MP3 player, a handheld personal computer (HPC), a personal digital assistant (PDA), a mobile phone, a smart phone, or another device as would be understood by one of skill in the art.

The controller 12 controls a data transmission between the data processing device 10 (i.e., a host) and a memory card 50. The controller 12 may also control an operation of the memory card 50 under the control of the processor. Hereinafter, the data processing device 10 is also referred to as the host.

The memory card 50 can be inserted into the memory card socket 30. The memory card socket 30 is included in the data processing device 10 in the embodiment illustrated in FIG. 1, but the memory card socket is not limited thereto. The memory card socket 30 may be an external device connected to the data processing device 10.

The memory card 50 may be a memory stick, a compact flash, a multi-media card (MMC), a secure digital (SD) card, a subscriber identity module (SIM) card, or a universal SIM (USIM) card. A pin arrangement of the memory card socket 30 connects with a pin arrangement of the memory card 50.

Figure 2:
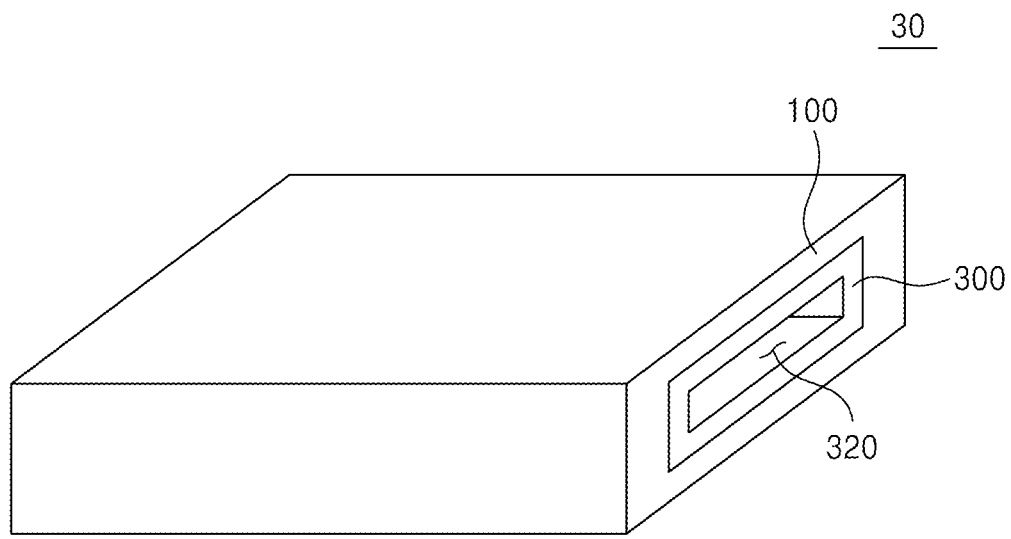
FIG. 2 is a perspective view of the memory card socket illustrated in FIG. 1.

FIG. 2 is a perspective view of the memory card socket 30 illustrated in FIG. 1. Referring to FIG. 2, the memory card socket 30 includes an outer case 100 and an inner case 300. The inner case 300 is movable within the outer case 100. A slot 320 into which the memory card 50 is inserted is embodied within the inner case 300.

Figure 3:
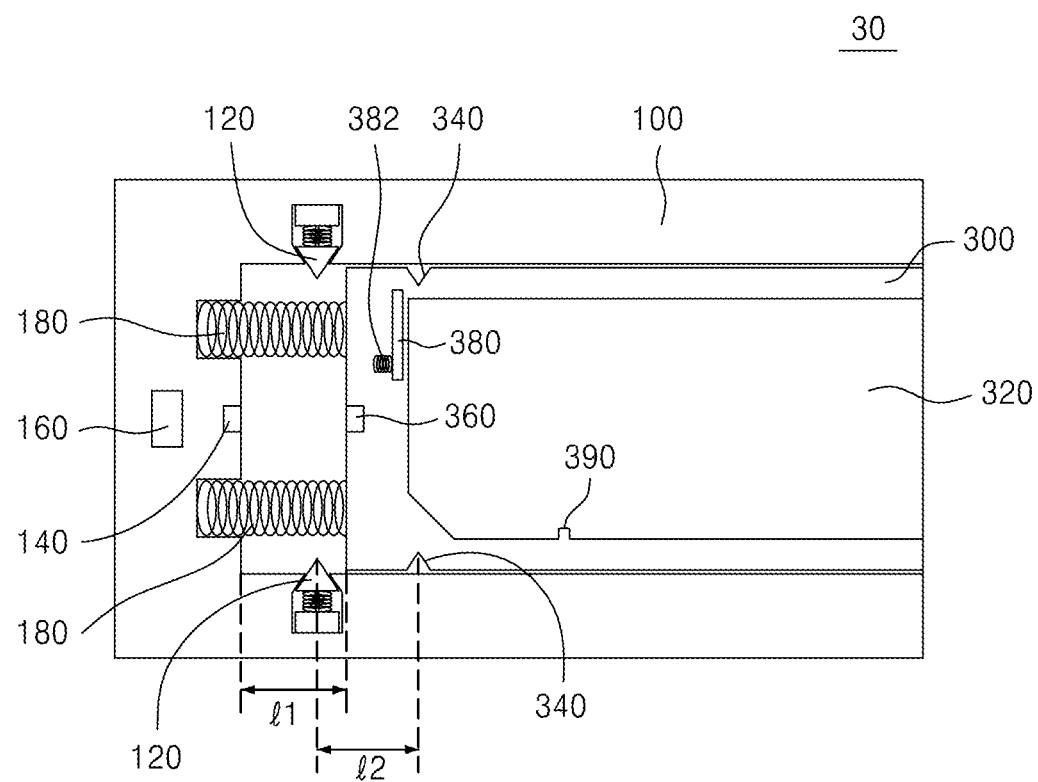
FIG. 3 is a cross sectional view of the memory card socket illustrated in FIG. 1 according to an exemplary embodiment.

FIG. 3 is a cross sectional view of the memory card socket 30 illustrated in FIG. 1 according to an exemplary embodiment. Referring to FIG. 3, the memory card 50 has been removed from the memory card socket 30.

The memory card socket 30 includes an outer case 100, an inner case 300, and a locking portion. The outer case 100 includes a sensor 140, a release signal generator 160, and elastic means, e.g., one or more springs 180.

The sensor 140 is provided inside the outer case 100. The sensor 140 senses a withdrawal of the memory card 50 and generates a sense signal. The sensor 140 generates the sense signal when the sensor 140 contacts a contactor 360 provided on the inner case 300.

The release signal generator 160 transmits a memory card detachment signal, generated in response to the sense signal, to the data processing device 10 and then transmits a release signal to the locking portion to release the lock of the locking portion. The memory card detachment signal is used to indicate that the memory card 50 is detached from the host. The release signal generator 160 may transmit the release signal to the locking portion a predetermined period of time after the release signal generator 160 receives the sense signal. Alternatively, the release signal generator 160 may transmit the release signal to the locking portion after a data transmission between the memory card 50 and the host stops.

The spring 180 pushes the inner case 300 outward to enable the withdrawal of the memory card 50.

The inner case 300 includes the contactor 360, a trigger 380, and card fixing means 390. The contactor 360 contains a metal and establishes an electrical contact with the sensor 140 signaling a withdrawal of the memory card 50. The sensor 140 may sense the withdrawal of the memory card 50 based on the change in current or voltage which occurs when the electrical contact is established.

The trigger 380 discharges the memory card 50 from the slot 320 upon the withdrawal of the memory card 50. The trigger 380 may include elastic means, e.g., a spring 382.

The card fixing means 390 fixes the memory card 50 to the inner case 300 to prevent the memory card 50 from unintentionally separating from the inner case 300. The card fixing means 390 may comprise a projection which is inserted into a fixing groove 52 in the memory card 50, so that the memory card 50 is fixed to the inner case 300.

The locking portion is provided in both of the inner case 300 and the outer case 100 to lock the inner case 300 to the outer case 100 upon the withdrawal of the memory card 50. The locking portion includes a stopper 120 formed in the outer case 100 and an insertion groove 340 formed in the inner case 300, so that the stopper 120 is insertable into the insertion groove 340.

The stopper 120 may include an electromagnet and may thereby release the locking in response to the release signal. The release signal may be a power signal which controls the electromagnet. The electromagnet breaks away from the insertion groove 340 in response to the release signal, so that the locking is released. The number of locking portions is not limited.

When the memory card 50 is withdrawn, the inner case 300 moves inward toward the outer case 100 by a length of l1. At this time, the stopper 120 is inserted into the insertion groove 340, so that the inner case 300 is locked to the outer case 100. The length of l1 is the same as a length of l2. The position of the locking portion may vary and is not limited to the specific positions described herein. Likewise, the structure and the operation of the locking portion may also vary and is not limited to the specific structure and operation described herein.

FIGS. 4A through 4D are diagrams for explaining the withdrawal of the memory card 50 from the memory card socket 30 illustrated in FIG. 1.

Figure 4A:
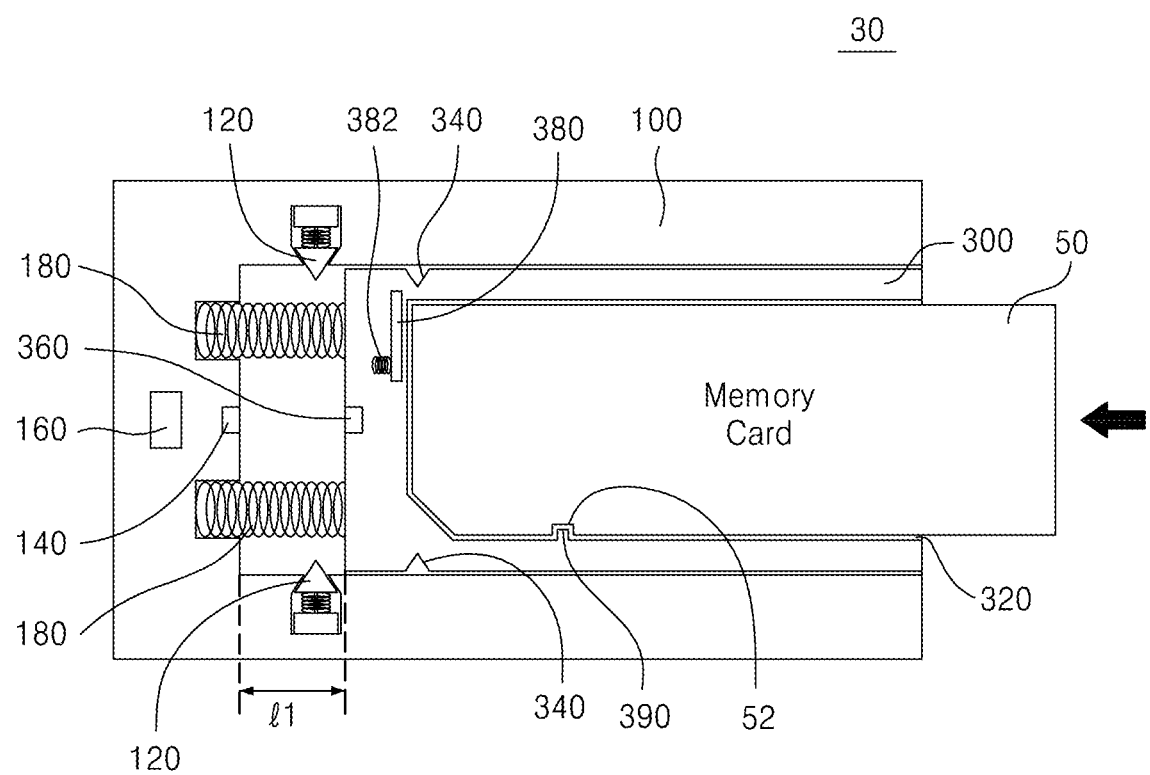
FIGS. 4A through 4D are diagrams for explaining a withdrawal of a memory card from the memory card socket illustrated in FIG. 1.
Figure 4B:
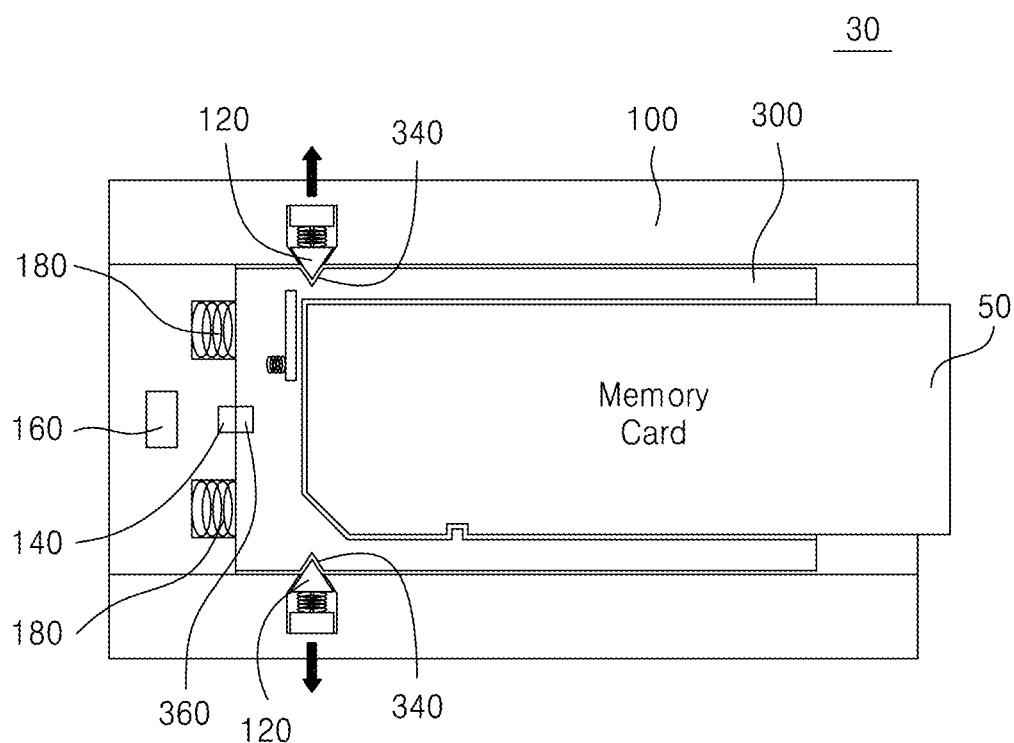

Referring to FIG. 4A, the memory card 50 has been inserted into the slot 320 in the inner case 300. To withdraw the memory card 50 from the memory card socket 30, a movement of pushing the memory card 50 inward to the memory card socket 30 is required. Referring to FIG. 4B, the inner case 300 moves inward toward the outer case 100 due to the pushing movement. As the inner case 300 moves, the locking portion locks the inner case 300 to the outer case 100. In other words, the stopper 120 is inserted into the insertion groove 340 so that the inner case 300 is locked to the outer case 100.

Meanwhile, as the inner case 300 moves, the contactor 360 contacts the sensor 140. Thereby, the sensor 140 senses the withdrawal of the memory card 50 and generates a sense signal.

The release signal generator 160 transmits a memory card detachment signal to the host in response to the sense signal and then transmits a release signal for releasing the locking to the locking portion.

Figure 4C:
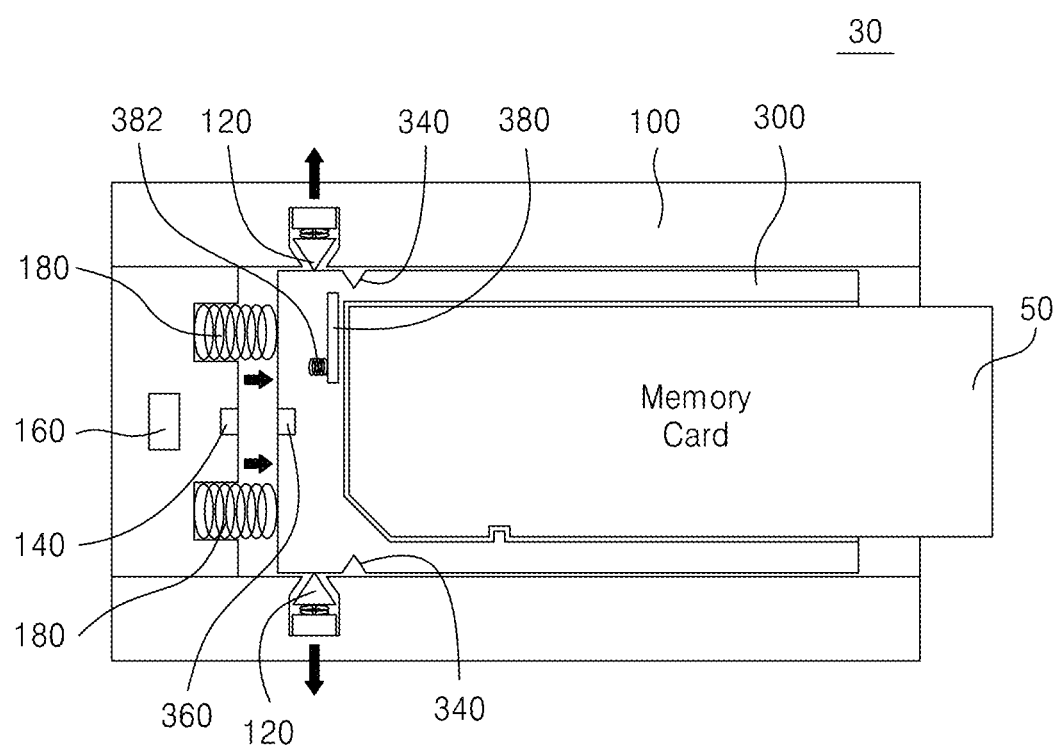
Figure 4D:
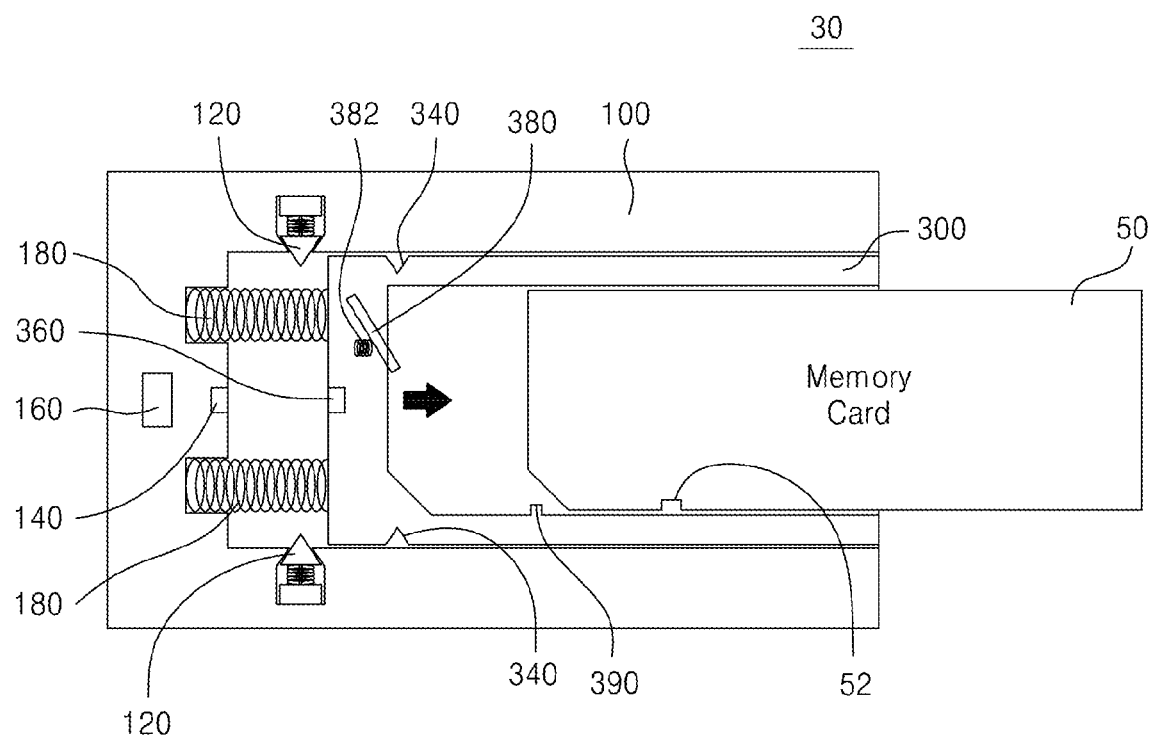

Referring to FIGS. 4C and 4D, the stopper 120 releases the locking in response to the release signal. When the locking is released, the spring 180 pushes the inner case 300 outward. At this time, the trigger 380 impacts the memory card 50 so that the memory card 50 is detached from the inner case 300. The engagement between the fixing means 390 and the fixing groove 52 is released by the impact given by the trigger 380, and the memory card 50 is discharged. The spring 180 and the trigger 380 may operate simultaneously or separately at a predetermined interval.

Figure 5:
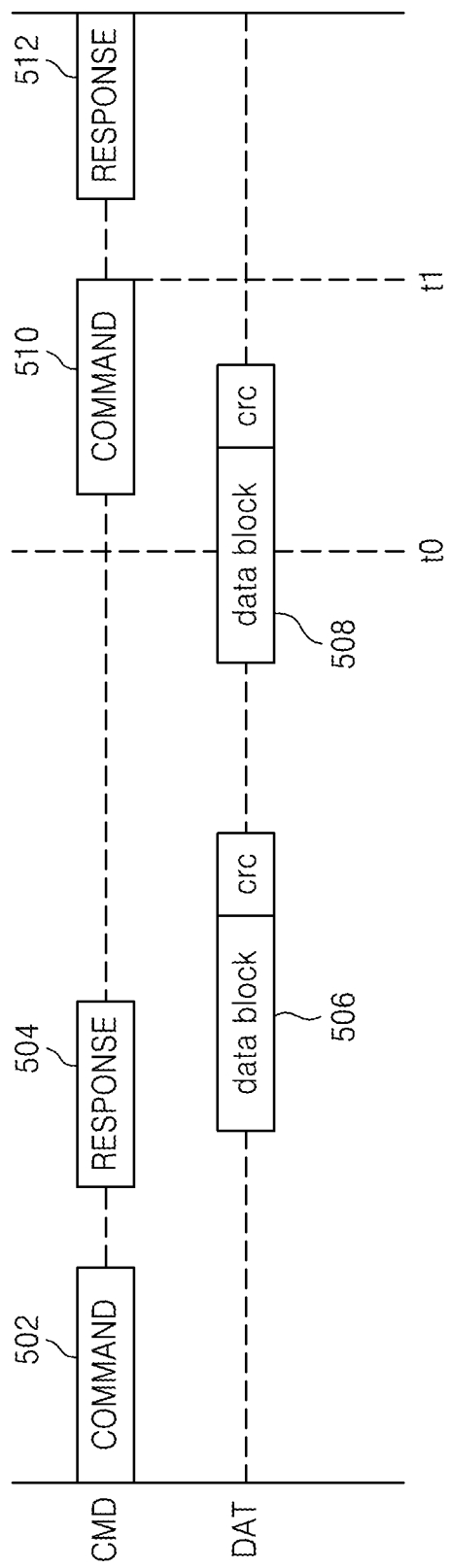
FIGS. 5 and 6 are diagrams for explaining the operations of the memory card socket while data is being transmitted between a host and the memory card which are illustrated in FIG. 1.
Figure 6:
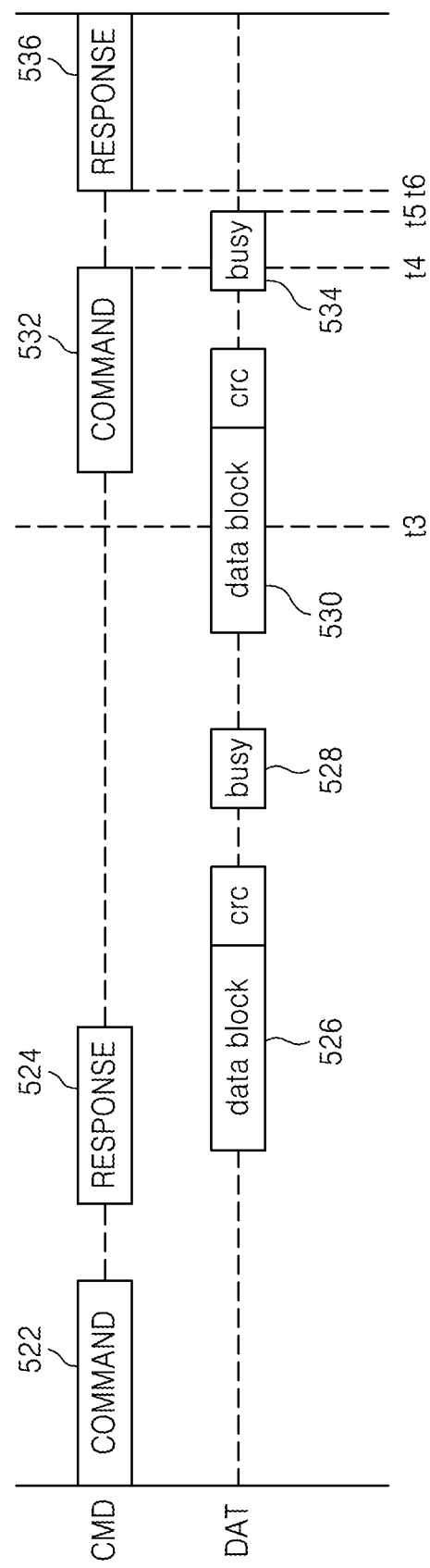

FIGS. 5 and 6 are diagrams for explaining the operations of the memory card socket 30 while data is being transmitted between the host and the memory card 50 which are illustrated in FIG. 1. The memory card 50 may be a memory card complying with SD card version 3.0, but it is not limited thereto.

FIG. 5 shows a read operation performed on the memory card 50. FIG. 6 shows a write operation performed on the memory card 50. Referring to FIG. 5, in order to read data from the memory card 50, the controller 12 transmits a read command 502 to the memory card 50 through a command line CMD. The memory card 50 transmits a response 504 to the read command 502 to the controller 12 through the command line CMD and transmits a data block 506 through a data line DAT.

When the withdrawal of the memory card 50 starts at a time point t0, the locking portion is still locking the inner case 300 to the outer case 100. Accordingly, the transmission of a data block 508 through the data line DAT is not stopped. At this time, the sensor 140 senses the withdrawal of the memory card 50 and generates a sense signal. The release signal generator 160 transmits a memory card detachment signal to the controller 12 in response to the sense signal.

The controller 12 transmits a stop command 510 (e.g., CMD12) to the memory card 50 in response to the memory card detachment signal. The memory card 50 receives the stop command 510 at a time point t1 and stops data transmission through the data line DAT. Thereafter, the memory card 50 transmits a response 512 to the stop command 510 to the controller 12.

The release signal generator 160 transmits a release signal to the locking portion in response to the response 512 to the stop command 510 since data transmission between the data processing device 10 and the memory card 50 is stopped. The locking portion releases the locking in response to the release signal, thereby completing the withdrawal of the memory card 50.

As described above, the release signal generator 160 may transmit the release signal to the locking portion when the data transmission between the data processing device 10 and the memory card 50 is terminated. As an alternative, the release signal generator 160 may transmit the release signal to the locking portion a predetermined period of time after receiving the sense signal. In another alternative, when data is not being transmitted between the data processing device 10 and the memory card 50, the release signal generator 160 may transmit the release signal to the locking portion immediately after receiving the sense signal.

Referring to FIG. 6, in order to write data to the memory card 50, the controller 12 transmits a write command 522 to the memory card 50 through the command line CMD.

The memory card 50 transmits a response 524 to the write command 522 to the controller 12 through the command line CMD. The controller 12 transmits a data block 526 to the memory card 50 through the data line DAT in response to the response 524. The memory card 50 transmits a busy signal 528 to the controller 12 through the data line DAT while writing the data block 526 received through the data line DAT.

When the withdrawal of the memory card 50 starts at a time point t3, the locking portion is locking the inner case 300 to the outer case 100. Accordingly, the transmission of a data block 530 through the data line DAT is not stopped. At this time, the sensor 140 senses the withdrawal of the memory card 50 and generates a sense signal. The release signal generator 160 transmits a memory card detachment signal to the controller 12 in response to the sense signal.

The controller 12 transmits a stop command 532 (e.g., CMD12) to the memory card 50 in response to the memory card detachment signal. The memory card 50 receives the stop command 532 at a time point t4. Since the data block 530 received through the data line DAT is being written at the time point t4, the memory card 50 does not stop the writing operation but transmits a busy signal 534 through the data line DAT. The memory card 50 stops the writing operation at a time point t5 when the writing of the data block 530 is completed and then transmits a response 536 to the stop command 532 to the controller 12 at a time point t6.

The release signal generator 160 transmits a release signal to the locking portion in response to the response 536 to the stop command 532 since data transmission between the data processing device 10 and the memory card 50 is stopped. The locking portion releases the locking in response to the release signal, thereby completing the withdrawal of the memory card 50.

Figure 7:
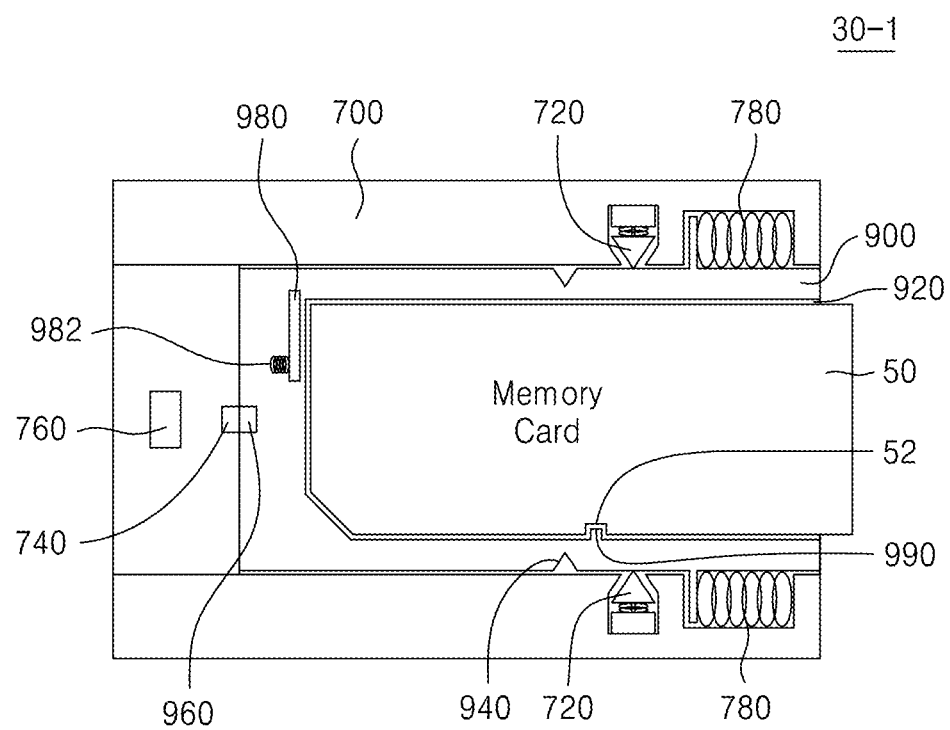
FIG. 7 is a diagram of a memory card socket according to an exemplary embodiment.

FIG. 7 is a diagram of a memory card socket 30-1 according to an exemplary embodiment. In FIG. 7, the memory card 50 is withdrawn from the memory card socket 30-1 using a pull-out method. Hereinafter, redundant descriptions of the same operations between the memory card socket 30-1 and the memory card socket 30 illustrated in FIG. 3 will be omitted.

Referring to FIG. 7, the memory card socket 30-1 includes an outer case 700, an inner case 900, and a locking portion. The outer case 700 includes a sensor 740, a release signal generator 760, and elastic means, e.g., a spring 780.

The sensor 740 is provided inside the outer case 700. The sensor 740 senses the withdrawal of the memory card 50 and generates a sense signal. The sensor 740 generates the sense signal when the sensor 740 is separated from a contactor 960 provided on the inner case 900.

The release signal generator 760 transmits a memory card detachment signal, generated in response to the sense signal, to the data processing device 10, i.e., the host and then transmits a release signal to the locking portion to release the locking of the locking portion. The memory card detachment signal is used to indicate that the memory card 50 is detached from the host. The release signal generator 760 may transmit the release signal to the locking portion a predetermined period of time after the release signal generator 760 receives the sense signal. Alternatively, the release signal generator 760 may transmit the release signal to the locking portion after data transmission between the memory card 50 and the host stops.

The spring 780 pushes the inner case 900 to the inside of the outer case 700 at the withdrawal of the memory card 50.

The inner case 900 includes the contactor 960, a trigger 980, and card fixing means 990. The contactor 960 contains a metal and is separated from the sensor 740 upon the withdrawal of the memory card 50. When the contactor 960 is separated from the sensor 740, the electrical contact formed between the contactor 960 and the sensor 140 is broken. The sensor 740 thereby senses the withdrawal of the memory card 50 based on the change in current or voltage which occurs when the electrical contact is broken.

The trigger 980 discharges the memory card 50 from a slot 920 upon the withdrawal of the memory card 50. The trigger 980 may include elastic means, e.g., a spring 982. The card fixing means 990 fixes the memory card 50 to the inner case 900 to prevent the memory card 50 from separating from the inner case 900. The card fixing means 990 is inserted into the fixing groove 52 implemented at the memory card 50, so that the memory card 50 is fixed to the inner case 900.

The locking portion is provided in both of the inner case 900 and the outer case 700 to lock the inner case 900 to the outer case 700 upon the withdrawal of the memory card 50. The locking portion includes a stopper 720 formed in the outer case 700 and an insertion groove 940 formed in the inner case 900, so that the stopper 720 is inserted into the insertion groove 940.

The stopper 720 may include an electromagnet and may release the locking in response to the release signal. The release signal may be a power signal for controlling the electromagnet. The electromagnet breaks away from the insertion groove 940 in response to the release signal, so that the locking is released. The number of locking portions is not limited.

When the memory card 50 is withdrawn, the inner case 900 moves to an outside of the outer case 700. At this time, the stopper 720 is inserted into the insertion groove 940, so that the inner case 900 is locked to the outer case 700. A position of the locking portion may vary and is not limited to the specific position described herein. In addition, the structure and the operation of the locking portion may also vary and are not limited to the specific structure and operation as described herein.

The locking portion releases the locking of the inner case 900 in response to the release signal. Thereby, the memory card 50 is discharged by the trigger 980 from the memory card socket 30-1 and the inner case 900 moves inward to the outer case 700 by the elastic force of the spring 780.

As described above, according to one or more exemplary embodiments, an inner case is locked to an outer case in a memory card socket when a memory card is withdrawn from the memory card socket, thereby preventing an SPO situation from occurring in the memory card.

In addition, the memory card socket prevents the SPO situation from occurring in the memory card, thereby preventing data in the memory card from being damaged.

While exemplary embodiments have been particularly shown and described, it will be understood by those of ordinary skill in the art that various changes in forms and details may be made therein without departing from the spirit and scope of the present inventive concept as defined by the following claims.

What is claimed is:

1. A memory card socket comprising:
   an outer case;
   an inner case which is movable within the outer case and comprises a slot into which a memory card is insertable;
   a locking portion which locks the inner case to the outer case upon a withdrawal of the memory card;
   a sensor which is disposed in the outer case, senses the withdrawal of the memory card, and generates a sense signal; and
   a release signal generator which transmits a memory card detachment signal to a host in response to the sense signal and transmits a release signal for releasing a locking of the locking portion, to the locking portion, in response to the sense signal.

2. The memory card socket of claim 1, wherein the sensor generates the sense signal when a contactor provided in the inner case contacts the sensor.

3. The memory card socket of claim 1, wherein the sensor generates the sense signal when a contactor provided in the inner case is separated from the sensor.

4. The memory card socket of claim 1, wherein the locking portion comprises:
   a stopper disposed inside the outer case; and
   an insertion groove, disposed in the inner case, into which the stopper is insertable.

5. The memory card socket of claim 1, wherein the locking portion comprises a stopper dispose inside the outer case and an insertion groove, disposed in the inner case, into which the stopper is insertable and releases the stopper from the insertion groove in response to the release signal.

6. The memory card socket of claim 1, wherein a pin arrangement of the memory card socket corresponds to a pin arrangement selected from a group consisting of a secure digital (SD) card pin arrangement, a multi-media card (MMC) pin arrangement, a subscriber identity module (SIM) card pin arrangement, and a universal SIM (USIM) pin arrangement.

7. The memory card socket of claim 1, wherein the release signal generator transmits the release signal a predetermined period of time after receiving the sense signal.

8. The memory card socket of claim 1, wherein the release signal generator transmits the release signal after data transmission between the memory card and the host stops.

9. The memory card socket of claim 1, wherein the sensor comprises an electrical contact sensor.

10. The memory card socket of claim 1, wherein the sensor generates the sense signal in response to sensing the withdrawal of the memory card.

11. A data processing device comprising
   a memory card socket into which a memory card is inserted; and
   a controller configured to control an operation of the memory card,
   wherein the memory card socket comprises:
   an outer case;
   an inner case which is movable within the outer case and comprises a slot into which the memory card is insertable;

a locking portion which locks the inner case to the outer case upon a withdrawal of the memory card, a sensor which is disposed in the outer case, senses the withdrawal of the memory card, and generates a sense signal; and a release signal generator which transmits a memory card detachment signal to the controller in response to the sense signal and transmits a release signal for releasing a locking of the locking portion to the locking portion, in response to the sense signal.

12. The data processing device of claim 11, wherein the sensor generates the sense signal when a contactor provided in the inner case contacts the sensor.

13. The data processing device of claim 11, wherein the sensor generates the sense signal when a contactor provided in the inner case is separated from the sensor.

14. The data processing device of claim 11, wherein the locking portion comprises:

a stopper disposed inside the outer case; and an insertion groove, disposed in the inner case, into which the stopper is insertable.

15. The data processing device of claim 11, wherein the locking portion comprises a stopper disposed inside the outer case and an insertion groove, disposed in the inner case, into which the stopper is insertable and releases the stopper from the insertion groove in response to the release signal.

16. The data processing device of claim 11, wherein the sensor comprises an electrical contact sensor.

17. A memory card socket comprising:

an outer case;

an inner case which is moveable within the outer case, wherein the inner case comprises a card fixing means for holding a memory card within the inner case;

a sensor which senses a withdrawal of the memory card and generates a sense signal; and a locking portion which locks the inner case with respect to the outer case and which releases a locking between the inner case and the outer case after the sense signal is generated.

18. The memory card socket of claim 17, wherein the sensor comprises an electrical contact sensor.

* * * * *